US012775341B2

(12) United States Patent
Li

(10) Patent No.: US 12,775,341 B2
(45) Date of Patent: Oct. 27, 2026

(54) FINGER MOUNTED CONTROLLER AND A POWER REPLENISHMENT DEVICE

(71) Applicant: Hui Li, Shenzhen City (CN)

(72) Inventor: Hui Li, Shenzhen City (CN)

( * ) Notice: Subject to any disclaimer, the term of this patent is extended or adjusted under 35 U.S.C. 154(b) by 0 days.

(21) Appl. No.: 19/084,700

(22) Filed: Mar. 19, 2025

(65) Prior Publication Data

US 2026/0277338 A1 Sep. 17, 2026

(30) Foreign Application Priority Data

Mar. 11, 2025 (CN) ......................... 202520420129.1

(51) Int. Cl.
*G06F 3/0338* (2013.01)
*G06F 3/038* (2013.01)

(52) U.S. Cl.
CPC ............ *G06F 3/0338* (2013.01); *G06F 3/038* (2013.01); *G06F 2203/0331* (2013.01)

(58) Field of Classification Search
None
See application file for complete search history.

(56) References Cited

U.S. PATENT DOCUMENTS 8,681,101 B1 * 3/2014 Haney .................... G06F 3/033 345/161
9,870,052 B2 1/2018 Higgins et al.
10,139,966 B2 * 11/2018 Pelis .................... G06F 3/0346
10,691,180 B2 * 6/2020 Choi .................... G06F 3/0338
12,013,725 B2 6/2024 von Badinski et al.
12,191,692 B2 * 1/2025 Sanchez ............... A44C 9/0053
2006/0164383 A1 * 7/2006 Machin ................ G06F 3/0338 345/156
2015/0277559 A1 * 10/2015 Vescovi ................ G06F 1/163 345/173
2017/0113132 A1 * 4/2017 Mortazavi ............... A63F 13/24
2017/0212588 A1 * 7/2017 Kim .................... G06F 3/03547
2019/0187835 A1 * 6/2019 Griffin .................... H04W 4/20
2022/0085841 A1 * 3/2022 Grétarsson ............. G06F 3/014
2024/0281064 A1 * 8/2024 Blair .................... G06F 3/0338

* cited by examiner

*Primary Examiner* — Sarvesh J Nadkarni
(74) *Attorney, Agent, or Firm* — Birchwood IP

(57) ABSTRACT

A finger mounted controller and a power replenishment device are provided. The controller includes an outer shell, an upper cover, and a circuit board, a joystick control key is provided on the circuit board. A user only needs to insert his finger into a finger ring and easily operate the joystick control key by flipping a joystick key cap to trigger a corresponding function. Compared with traditional button operation methods, this joystick control method of the present disclosure is more convenient and flexible, improving the accuracy of operation and user experience. At the same time, the joystick design conforms to ergonomic principles, reducing a burden on fingers and allowing the user to use it comfortably for a long time. Besides that, the controller is further provided with a power replenishment device to provide power support for the finger mounted controller, ensuring that the controller can continue to work stably.

8 Claims, 9 Drawing Sheets

FINGER MOUNTED CONTROLLER AND A POWER REPLENISHMENT DEVICE

CROSS-REFERENCE TO RELATED APPLICATIONS

This application claims priority to Chinese Patent Application No. 202520420129.1, filed on Mar. 11, 2025, which is hereby incorporated by reference in its entirety.

TECHNICAL FIELD

The present disclosure relates to the field of electronic product technologies, and in particular, to a finger mounted controller that is convenient to operate and a power replenishment device.

BACKGROUND

With the development of technology and the popularization of smart devices, people's demand for convenient and efficient operation methods is increasing day by day. Especially in fields such as video control, remote control, and virtual reality, although traditional physical button operation ways are stable and reliable, they have certain limitations in terms of operational flexibility, convenience, and user experience.

Controlling the controller through buttons. Although this structure is simple and practical, in some application scenarios that require continuous and multi-directional operation, button operations may not appear flexible and convenient enough. A user needs to frequently press buttons at different positions, which not only increases a difficulty of operation, but may also lead to finger fatigue and misoperation.

SUMMARY

In response to the shortcomings of existing technology, the present disclosure provides a finger mounted controller that is convenient to operate and a power replenishment device, thereby solving problems raised by the background technology mentioned above.

To achieve the above objectives, the present disclosure is implemented through the following technical solutions.

In a first aspect, the present disclosure proposes a finger mounted controller for convenient operation, including a first outer shell and a first upper cover, where the first outer shell and the first upper cover are fixedly connected by a clamping structure, a first circuit board is fixedly provided in the first outer shell, and a joystick control key is integrated on the first circuit board; an interior of the first upper cover is movably provided with a joystick key cap, and the joystick key cap is fixedly connected to the joystick control key; the joystick key cap is capable of toggling the joystick control key in several directions on a horizontal plane to trigger a corresponding function.

In some embodiments of the present disclosure, an interior of the first outer shell is further fixedly provided with a first battery, the interior of the first upper cover is provided with a functional key cap, and a plurality of third through-holes are provided at a top of the first upper cover; the functional key cap is located in the third through-holes, a bottom of the joystick key cap runs through the third through-holes and is fixedly connected to the joystick control key.

In some embodiments of the present disclosure, a bottom of the first outer shell is integrally connected to a finger ring, and the finger ring is an elastic structure, an opening is provided between one end of the finger ring and the first outer shell.

In some embodiments of the present disclosure, a first through-hole is provided on a back of the first outer shell, and a second through-hole is provided on a front of the first outer shell; the first circuit board is further integrated with a function switch, a first indicator light, and a first electrode; when the function key cap is moved down, it abuts against the function switch; the first indicator light is located in the second through-hole, and the first electrode is located in the first through-hole; one end of the first electrode that is extended outward is protruded from the first through-hole.

In some embodiments of the present disclosure, the clamping structure includes a plurality of clamp protrusions integrally connected to a top inner side of the first outer shell, and a plurality of clamp slots provided on two sides of the first upper cover; after the first outer shell is assembled with the first upper cover, the clamp protrusions are clamped inside the clamp slots.

In a second aspect, the present disclosure further proposes a power replenishment device, which is suitable for the above-mentioned conveniently operated finger mounted controller, including a second outer shell and a second upper cover, where the second outer shell and the second upper cover are connected by a rotating shaft, a second battery is provided in the second outer shell, and a second circuit board is provided above the second battery and provided in the second outer shell.

In some embodiments of the present disclosure, a back of the second outer shell is provided with a fourth through-hole, a front of the second outer shell is provided with a fifth through-hole, and the second circuit board is respectively integrated with a second indicator light and a charging interface, where the second indicator light is located in the fifth through-hole, and the charging interface is located in the a fourth through-hole.

In some embodiments of the present disclosure, an interior of the second upper cover is fixedly connected to a first inner shell, and an upper placement groove is provided in the first inner shell; a top of the second outer shell is fixedly provided with a second inner shell, and a lower placement groove is provided in the second inner shell; shapes and sizes of the upper placement groove and the lower placement groove are adapted to the controller.

In some embodiments of the present disclosure, a second electrode is integrated on the second circuit board, and a sixth through-hole is provided at a bottom of the lower placement groove; the second electrode is located in the sixth through-hole, and one end of the second electrode that is extended upward is protrudes from the sixth through-hole.

In some embodiments of the present disclosure, when the controller is placed in the lower placement groove, one end of the second electrode abuts against one end of the first electrode.

The present disclosure provides a finger mounted controller that is convenient to operate and a power replenishment device. Compared with existing technologies, it has the following beneficial effects.

This conveniently operated finger mounted controller and power replenishment device allows a user to freely toggle the joystick in several directions on the horizontal plane to trigger different functions. This operation manner is more natural and smooth than traditional button operation. The user does not need to frequently press buttons at different positions and can complete various operations by gently shaking the joystick, thereby greatly improving the convenience and flexibility of operation. The joystick control manner has higher operating precision. The user can achieve precise function triggering by adjusting the position and force of the joystick. This refined operation manner helps to reduce misoperation and improve the accuracy of operations, especially in application scenarios that require high-precision control, such as video, remote control, etc. The advantages are particularly obvious. Traditional button operations require the user to frequently press buttons, and prolonged use can easily lead to finger fatigue. The joystick control manner of the present disclosure is more in line with ergonomic principles. The user only needs to gently shake the joystick to complete the operation, thereby greatly reducing the burden on fingers and allowing him to use the controller for a longer time in a comfortable manner. The joystick control manner brings the user a completely new operating experience. The user can feel more intuitive and natural feedback through the free swing of the joystick, which enhances the immersion and participation, rendering him more enjoyable and satisfied when using the controller.

Numeral reference: 1—first outer shell; 101—clamp protrusion; 102—finger ring; 103—first through-hole; 104—second through-hole; 2—first upper cover; 201—clamp slot; 202—third through-hole; 3—first circuit board; 301—function switch; 302—first indicator light; 303—first electrode; 4—first battery; 5—functional key cap; 6—joystick key cap; 7—joystick control key; 8—second outer shell; 81—fourth through-hole; 82—fifth through-hole; 9—second upper cover; 10—first inner shell; 1001—upper placement groove; 11—second battery; 12—second circuit board; 1201—second electrode; 1202—second indicator light; 1203—charging interface; 13—second inner shell; 1301—lower placement groove; 1302—sixth through-hole.

DESCRIPTION OF EMBODIMENTS

Below, the technical solutions in the embodiments of the present disclosure will be clearly and completely described in combination with the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

Figure 1:
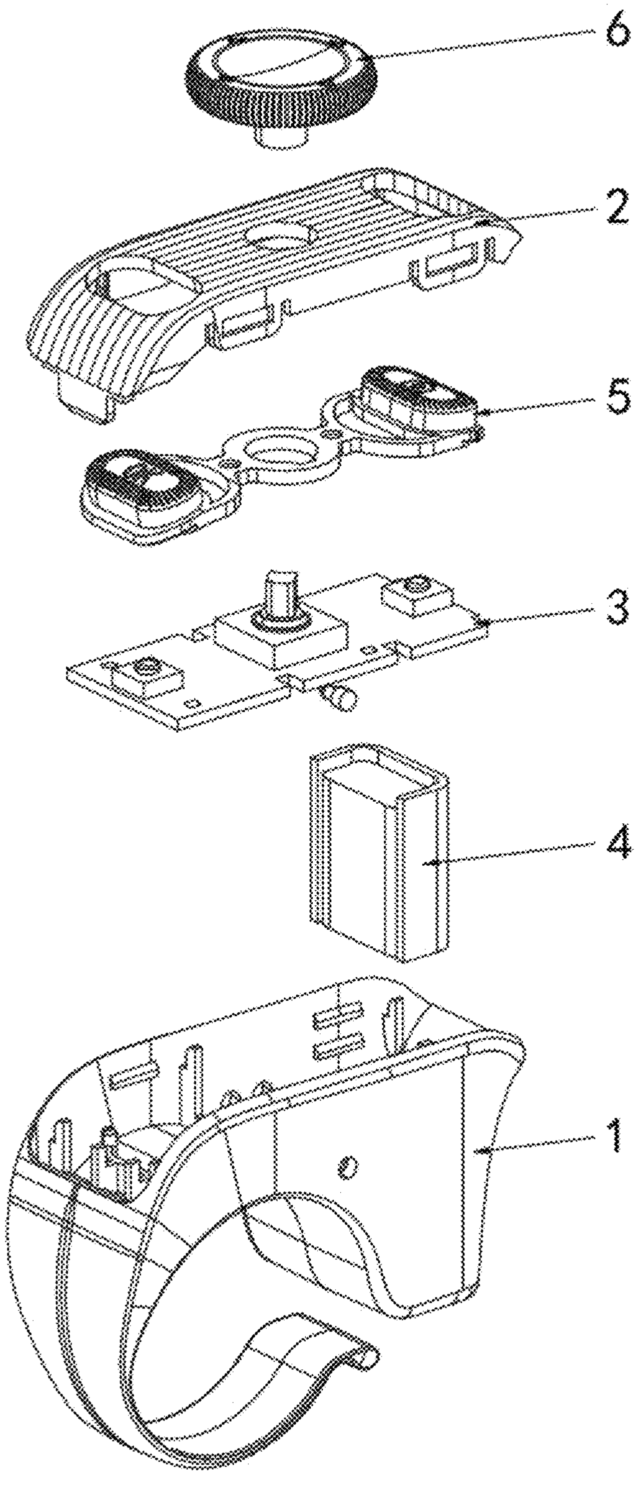
FIG. 1 is a schematic diagram of a split structure of a controller in the present disclosure.
Figure 2:
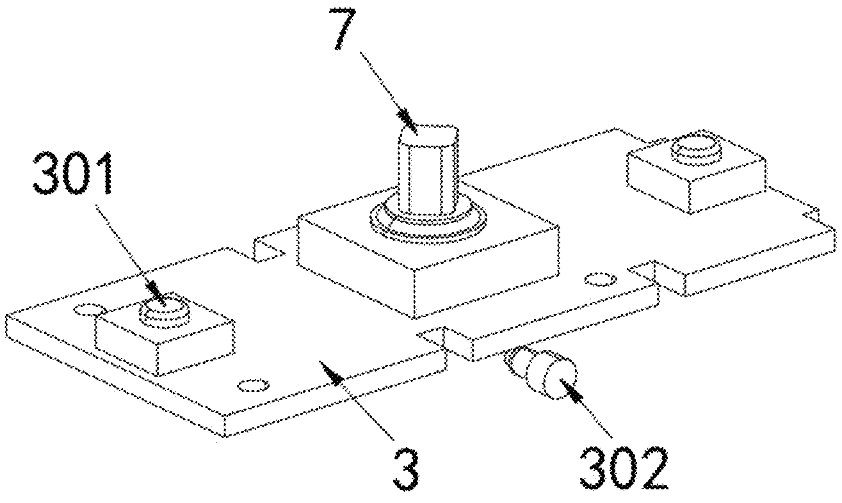
FIG. 2 is a schematic structural diagram of a first circuit board from a front perspective in the present disclosure.
Figure 3:
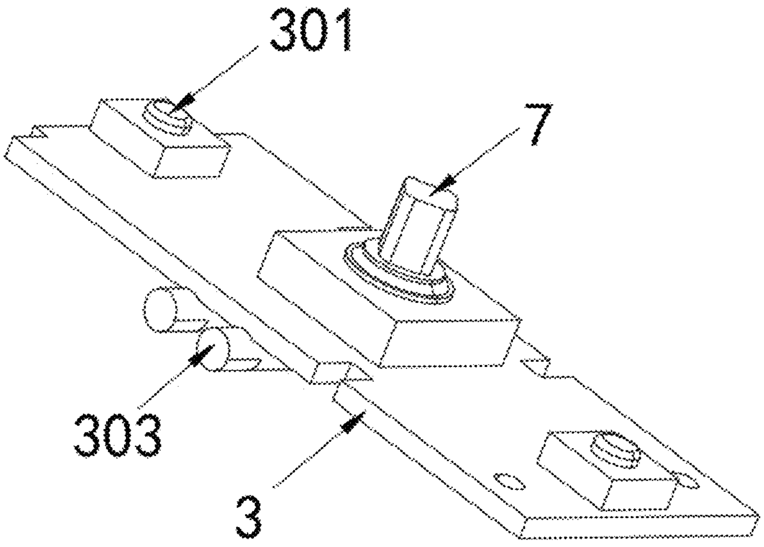
FIG. 3 is a schematic structural diagram of the first circuit board from a back perspective in the present disclosure.
Figure 4:
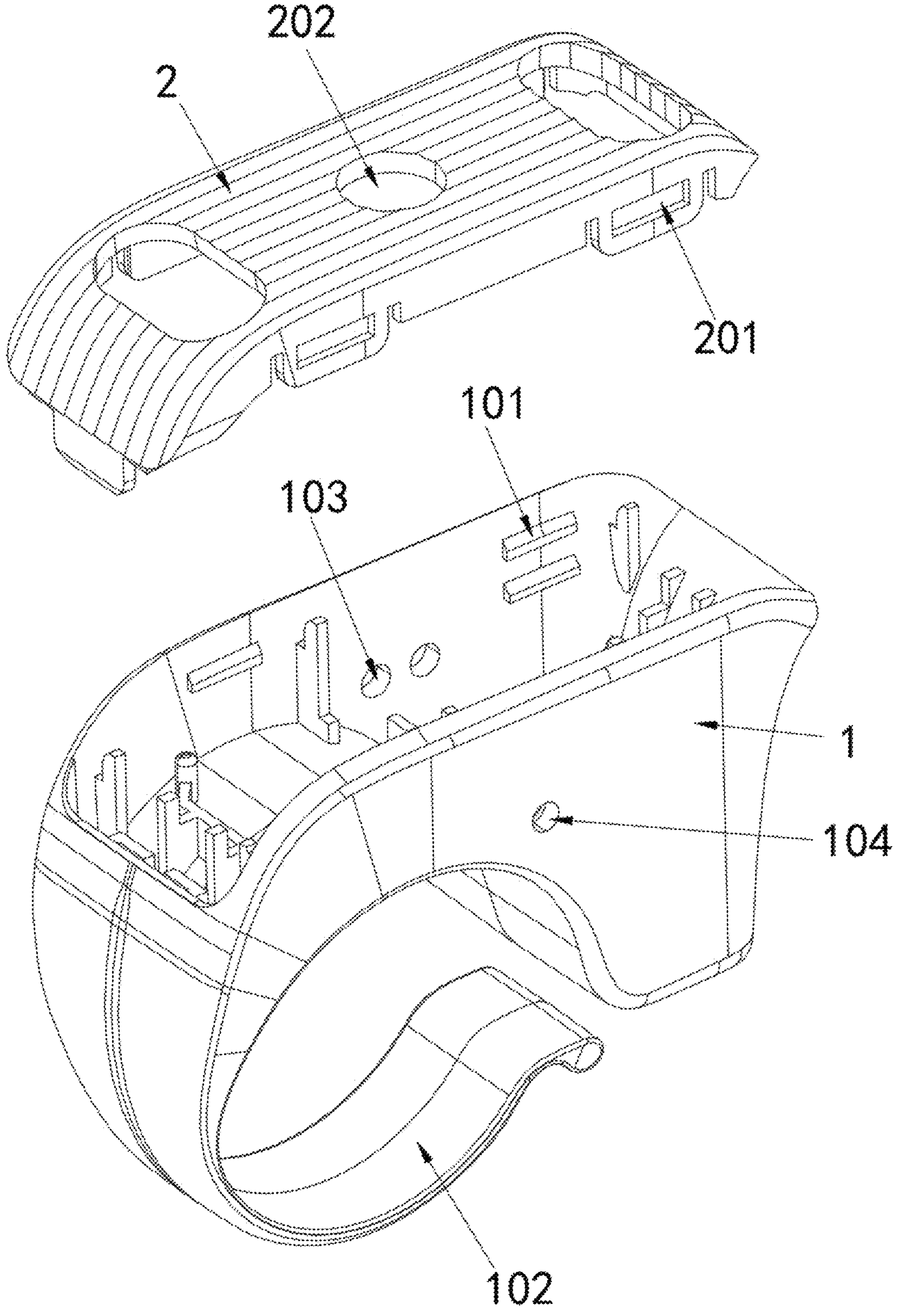
FIG. 4 is a schematic structural diagram of a first outer shell and a first upper cover in the present disclosure.
Figure 5:
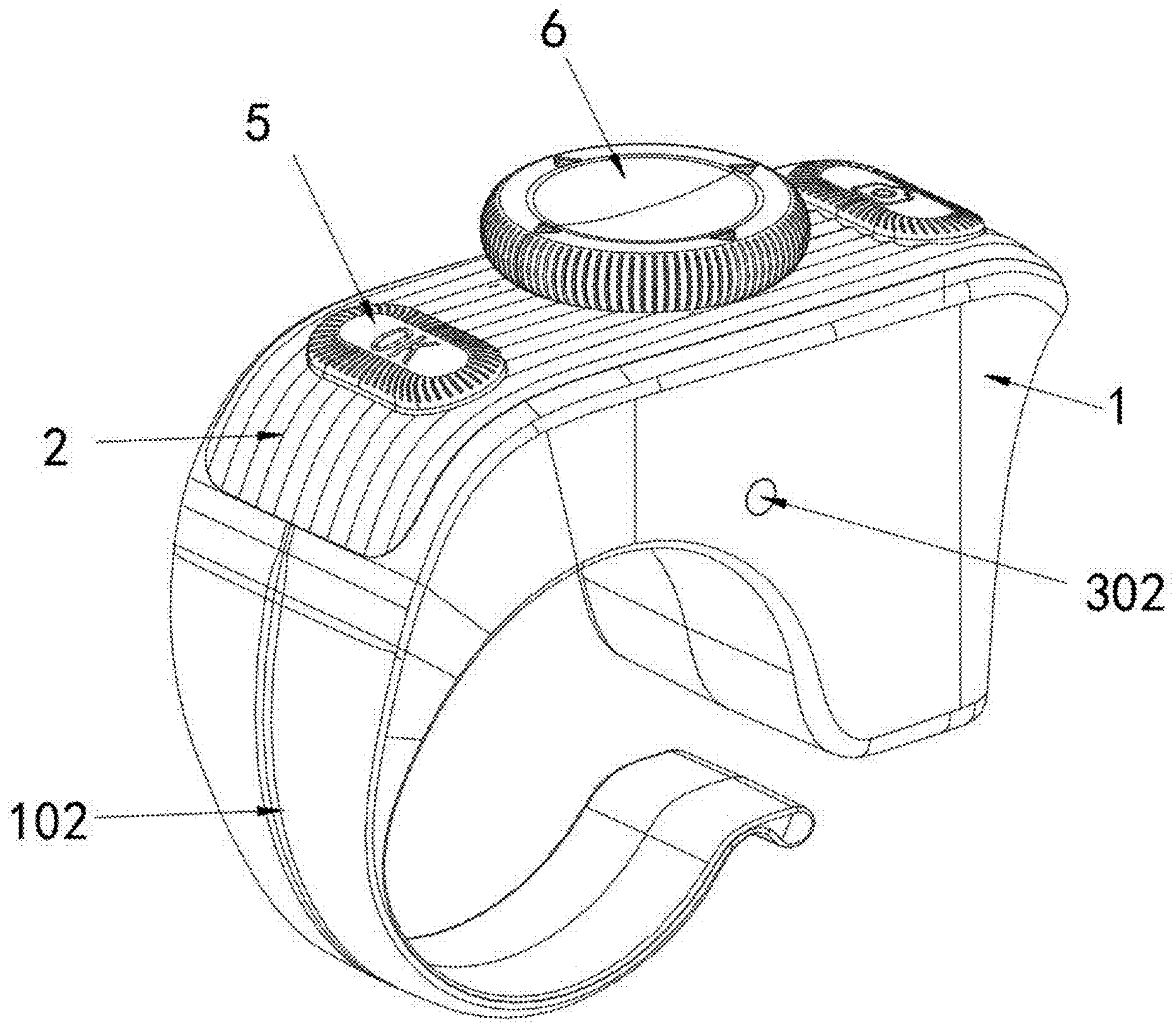
FIG. 5 is a schematic diagram of a front view of an assembled controller in the present disclosure.
Figure 6:
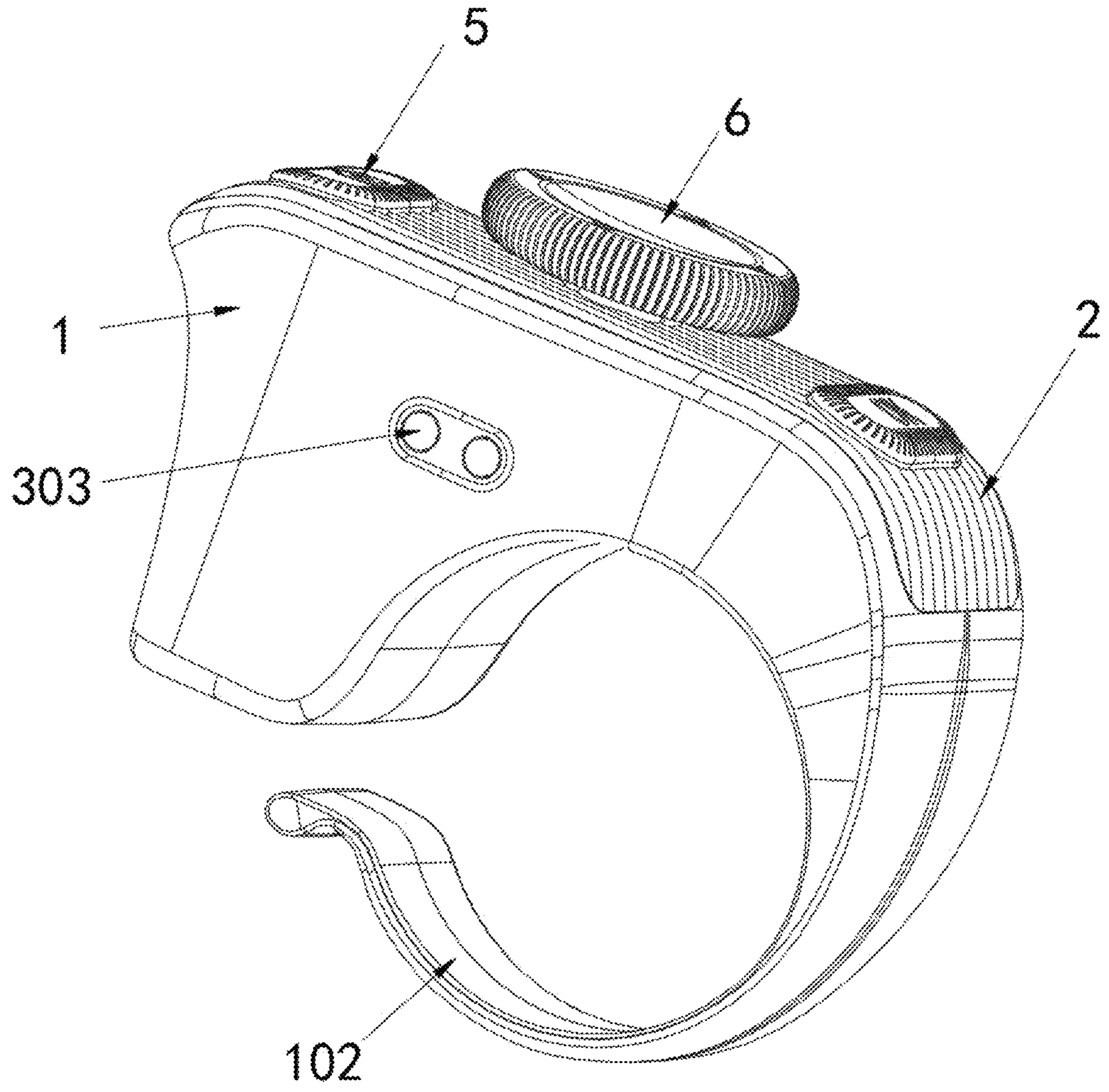
FIG. 6 is a schematic structural diagram from a back perspective of the assembled controller in the present disclosure.
Figure 7:
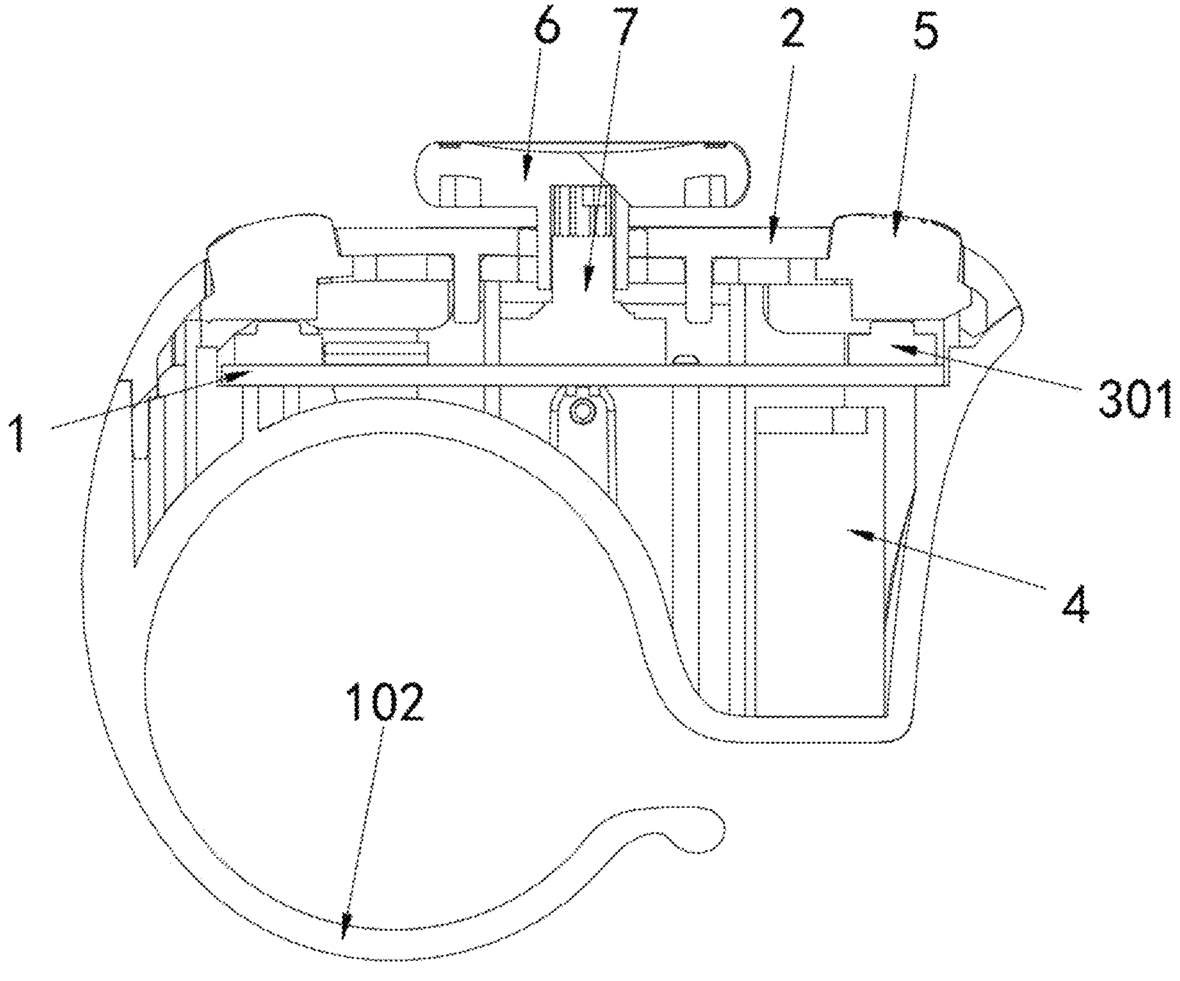
FIG. 7 is a half sectional view of the assembled controller in the present disclosure.

Please refer to FIGS. 1-7, a finger mounted controller that is convenient to operate, including a first outer shell 1 and a first upper cover 2. The first outer shell 1 and the first upper cover 2 are fixedly connected by a clamping structure. In an implementation mode, a top inner side of the first outer shell 1 is connected to a plurality of clamp protrusions 101, two sides of the first upper cover 2 are provided with a plurality of clamp slots 201. During assembly, the clamp protrusions 101 are clamped inside the clamp slots 201, thereby achieving a stable connection between the first outer shell 1 and the first upper cover 2.

An interior of first outer shell 1 is fixedly provided a first circuit board 3. On the first circuit board 3, a joystick control key 7, a function switch 301, a first indicator light 302, and a first electrode 303 are integrated. An interior the upper cover 2 is movably provided with a joystick key cap 6. A bottom of the joystick key cap 6 passes through the third though-hole 202 at a top of the first upper cover 2, and is fixedly connected to the joystick control key 7. The joystick key cap 6 can toggle the joystick control key 7 in several directions on a horizontal plane to trigger a corresponding function. Compared with the existing physical operation manner, this joystick operation manner is more convenient. An interior of the first upper cover 2 is further provided with a functional key cap 5, and the functional key cap 5 is located in a third through-hole 202. When the functional key cap 5 is moved down, it can abut against the function switch 301 on the first circuit board 3. The first indicator light 302 is located inside a second through-hole 104 provided on a front of the first outer shell 1, configured to display a working state of the controller. The first electrode 303 is located in the first through-hole 103 provided on a back of the first outer shell 1; one end of the first electrode 303 that is extended outward is protruded from the first through-hole 103, and configured to electrically connect with a power replenishment device.

A bottom of the first outer shell 1 is connected to a finger ring 102. The finger ring 102 is an elastic structure, and an opening is provided between one end of the finger ring 102 and the first outer shell 1, rendering it easy for a user to insert fingers into the finger ring 102, thus facilitating the wearing and use of the controller.

When using this controller, the user inserts finger into the finger ring 102 and operates the joystick control key 7 by toggling the joystick key cap 6 so as to trigger the corresponding function. At the same time, other functions can be controlled by pressing the function key cap 5 to touch the function switch 301. The first indicator light 302 is configured to display the working state of the controller, rendering it convenient for the user to understand a current state of the controller.

Figure 8:
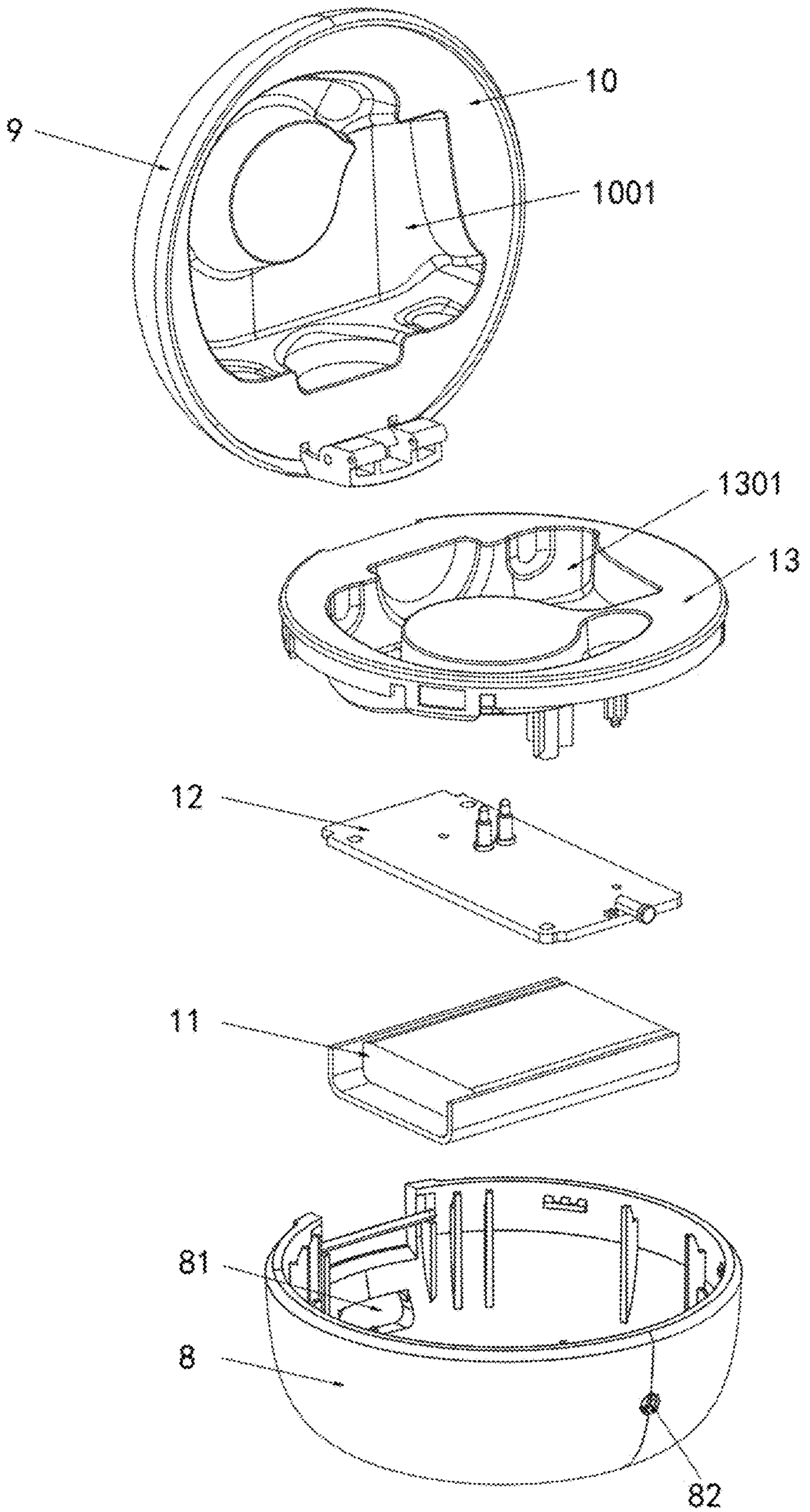
FIG. 8 is a schematic diagram of a disassembled structure of a power replenishment device in the present disclosure.
Figure 9:
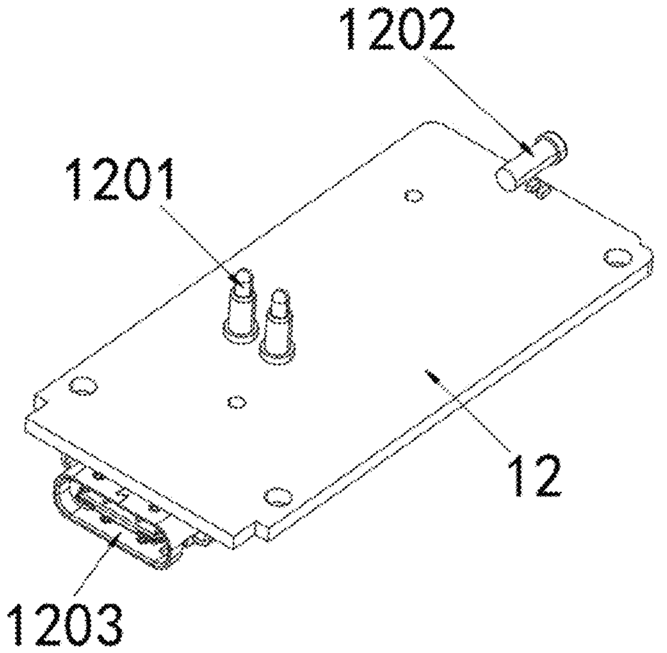
FIG. 9 is a schematic structural diagram of a second circuit board in the present disclosure.
Figure 10:
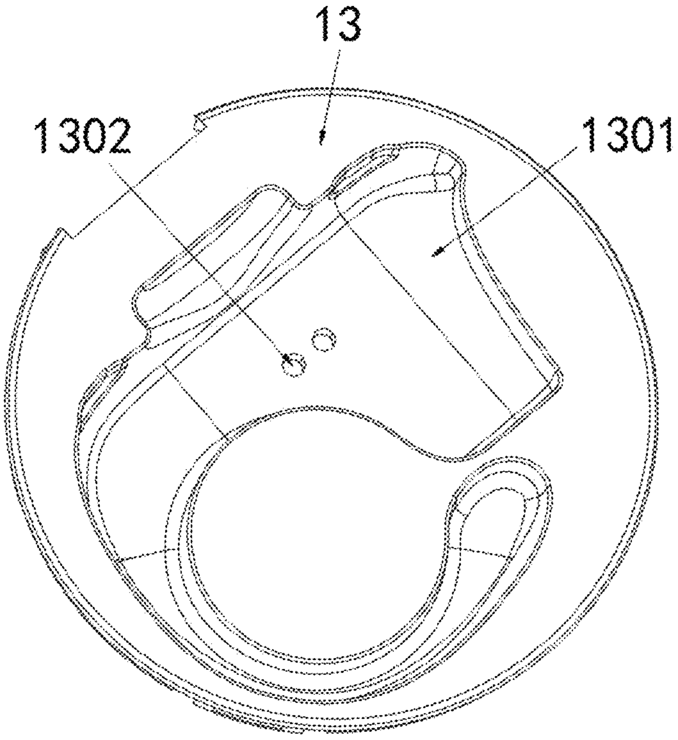
FIG. 10 is a schematic structural diagram of a second inner shell in the present disclosure.
Figure 11:
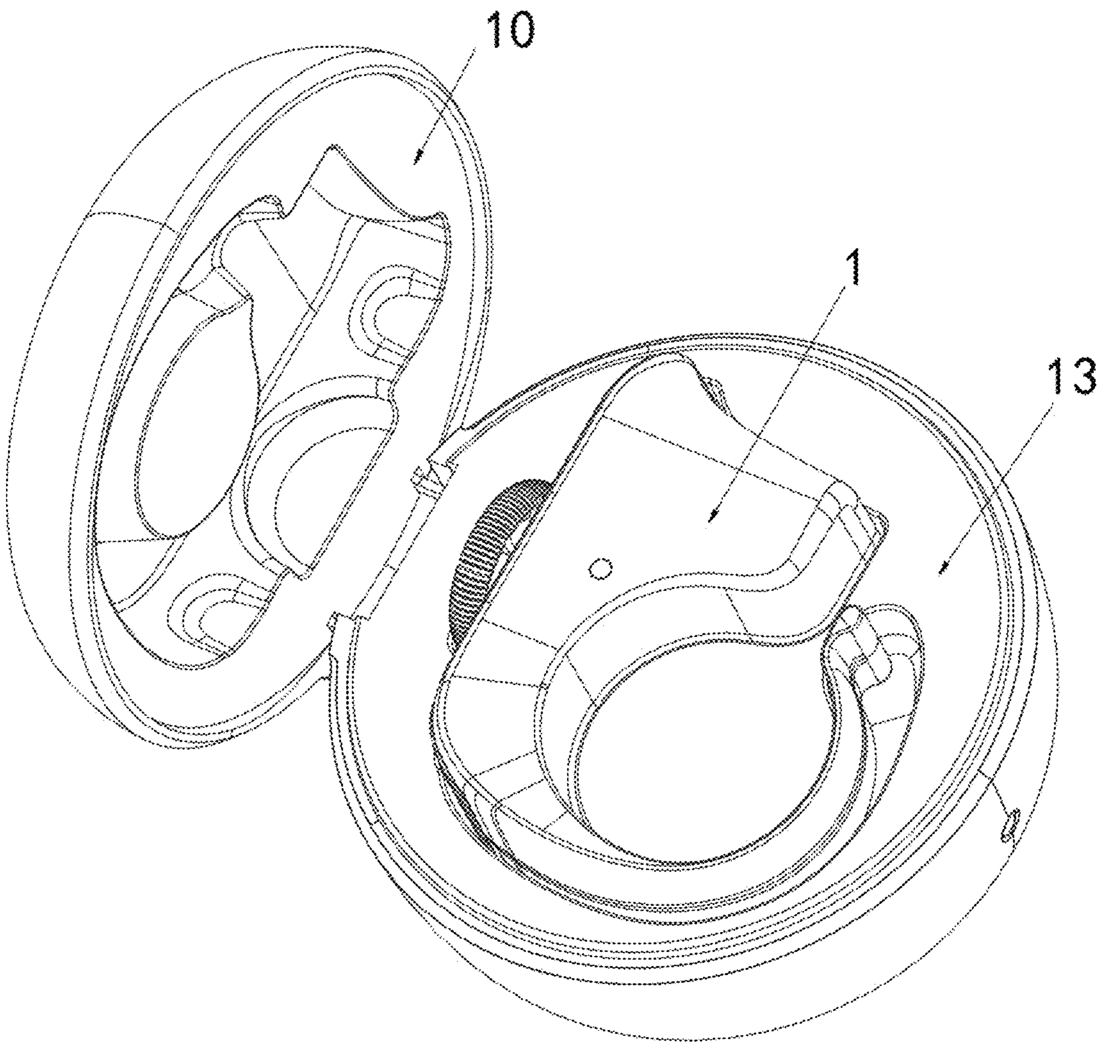
FIG. 11 is a schematic structural diagram of the controller placed in the power replenishment device in the present disclosure.

Please refer to FIGS. 8-11, a power replenishment device adapted for the above-mentioned conveniently operated finger mounted controller, including a second outer shell 8 and a second upper cover 9. The second outer shell 8 and the second upper cover 9 are connected by a rotating shaft, so that the second upper cover 9 can be opened or closed relative to the second outer shell 8. A second battery 11 is provided in the second outer shell 8 to provide power for the finger mounted controller, and a second circuit board 12 is provided above the second battery 11 and provided inside the second outer shell 8. On the second circuit board 12, a second indicator light 1202, a charging interface 1203, and a second electrode 1201 are respectively integrated. The second indicator light 1202 is located inside 82 provided on a front of the second outer shell 8, configured to display a working state of the power replenishment device. The charging interface 1203 is located inside 81 provided on a back of the second outer shell 8, configured to connect an external power source to charge the second battery 11. The second electrode 1201 is located inside a sixth through-hole 1302 at a bottom of a lower placement groove 1301 provided in a second inner shell 13 at a top of the second outer shell 8, and one end of the second electrode 1201 that is extended upward is protruded from the sixth through-hole 1302, configured to electrically connect with the first electrode 303 of the finger mounted controller.

An interior of the second upper cover 9 is fixedly connected to a first inner shell 10, and an interior of the first inner shell 10 is provided with an upper placement groove 1001. The top of the second outer shell 8 is fixedly provided with the second inner shell 13, and an interior of the second inner shell 13 is provided with the lower placement groove 1301. Shapes and sizes of the upper placement groove 1001 and lower placement groove 1301 are adapted to the finger mounted controller, configured for placing and fixing the finger mounted controller.

When using this power replenishment device, and when the power of the finger mounted controller is insufficient, the user can place the finger mounted controller inside the lower placement groove 1301 of the power replenishment device, so that one end of the second electrode 1201 abuts against one end of the first electrode 303, thereby achieving electrical connection. At this time, the second battery 11 provides power to the finger mounted controller for recharging. The second indicator light 1202 is configured to display the working state of the power replenishment device, rendering it convenient for the user to understand the progress of the power supply. When charging the second battery 11, the user can connect to the external power source through the charging interface 1203 for charging.

What is claimed is:

1. A power replenishment device applied to a finger mounted controller, comprising: a second outer shell and a second upper cover, wherein the second outer shell and the second upper cover are connected by a rotating shaft, a second battery is provided in the second outer shell, and a second circuit board is provided above the second battery and provided in the second outer shell;

wherein the finger mounted controller comprises a first outer shell and a first upper cover, wherein the first outer shell and the first upper cover are fixedly connected by a clamping structure, a first circuit board is fixedly provided in the first outer shell, and a joystick control key is integrated on the first circuit board;

an interior of the first upper cover is movably provided with a joystick key cap, and the joystick key cap is fixedly connected to the joystick control key;

the joystick key cap is capable of toggling the joystick control key in several directions on a horizontal plane to trigger a corresponding function;

wherein a back of the second outer shell is provided with a fourth through-hole, a front of the second outer shell is provided with a fifth through-hole, and the second circuit board is respectively integrated with a second indicator light and a charging interface, wherein the second indicator light is located in the fifth through-hole, and the charging interface is located in the fourth through-hole.

2. The power replenishment device according to claim 1, wherein an interior of the second upper cover is fixedly connected to a first inner shell, and an upper placement groove is provided in the first inner shell;

a top of the second outer shell is fixedly provided with a second inner shell, and a lower placement groove is provided in the second inner shell;

shapes and sizes of the upper placement groove and the lower placement groove are adapted to the controller.

3. The power replenishment device according to claim 2, wherein a second electrode is integrated on the second circuit board, and a sixth through-hole is provided at a bottom of the lower placement groove;

the second electrode is located in the sixth through-hole, and one end of the second electrode that is extended upward is protrudes from the sixth through-hole.

4. The power replenishment device according to claim 3, wherein when the controller is placed in the lower placement groove, one end of the second electrode abuts against one end of the first electrode.

5. The power replenishment device according to claim 1, wherein an interior of the first outer shell is further fixedly provided with a first battery, the interior of the first upper cover is provided with a functional key cap, and a plurality of third through-holes are provided at a top of the first upper cover;

the functional key cap is located in the third through-holes, a bottom of the joystick key cap runs through the third through-holes and is fixedly connected to the joystick control key.

6. The power replenishment device according to claim 1, wherein a bottom of the first outer shell is integrally connected to a finger ring, and the finger ring is an elastic structure, an opening is provided between one end of the finger ring and the first outer shell.

7. The power replenishment device according to claim 1, wherein a first through-hole is provided on a back of the first outer shell, and a second through-hole is provided on a front of the first outer shell;

the first circuit board is further integrated with a function switch, a first indicator light, and a first electrode;

when the function key cap is moved down, it abuts against the function switch;

the first indicator light is located in the second through-hole, and the first electrode is located in the first through-hole;

one end of the first electrode that is extended outward is protruded from the first through-hole.

8. The power replenishment device according to claim 1, wherein the clamping structure comprises a plurality of clamp protrusions integrally connected to a top inner side of the first outer shell, and a plurality of clamp slots provided on two sides of the first upper cover;

after the first outer shell is assembled with the first upper cover, the clamp protrusions are clamped inside the clamp slots.

* * * * *